US00RE41089E

(19) United States
(12) Reissued Patent
Hong

(10) Patent Number: US RE41,089 E
(45) Date of Reissued Patent: Jan. 26, 2010

(54) METHOD OF DECODING A CURRENT IMAGE

(75) Inventor: Min-Cheol Hong, Seoul (KR)

(73) Assignee: LG Electronics, Inc., Seoul (KR)

(21) Appl. No.: 11/892,177
(22) Filed: Aug. 20, 2007

Related U.S. Patent Documents

Reissue of:
(64) Patent No.: 6,611,361
Issued: Aug. 26, 2003
Appl. No.: 09/339,247
Filed: Jun. 24, 1999

U.S. Applications:
(62) Division of application No. 11/212,137, filed on Aug. 26, 2005.
(51) Int. Cl.
*H04N 1/04* (2006.01)

(52) U.S. Cl. ..... 358/474; 358/261.3; 358/426.07; 382/245; 382/253; 382/232; 382/268; 382/254; 375/E7.19; 375/E7.241

(58) Field of Classification Search ..... 358/474, 358/539, 261.3, 426.07, 426.03, 426.13; 382/245–254, 232, 233, 268; 375/E7.19, 375/E7.241
See application file for complete search history.

(56) References Cited

U.S. PATENT DOCUMENTS

| | | | | |
|---|---|---|---|---|
| 5,122,875 | A | 6/1992 | Raychaudhuri et al. | |
| 5,246,802 | A | 9/1993 | Kashida et al. | |
| 5,475,434 | A | 12/1995 | Kim | |
| 5,557,330 | A | 9/1996 | Astle | |
| 5,589,829 | A | 12/1996 | Astle | |
| 5,590,064 | A | 12/1996 | Astle | |
| 6,115,503 | A * | 9/2000 | Kaup | 382/268 |
| 6,144,700 | A | 11/2000 | Kim | |
| 6,148,109 | A | 11/2000 | Boon et al. | |
| 6,192,081 | B1 | 2/2001 | Chiang et al. | |
| 6,222,641 | B1 * | 4/2001 | Karidi | 358/1.9 |
| 6,222,881 | B1 | 4/2001 | Walker | |
| 6,246,802 | B1 * | 6/2001 | Fujihara et al. | 382/276 |
| 6,295,376 | B1 * | 9/2001 | Nakaya | 382/236 |
| 6,310,962 | B1 * | 10/2001 | Chung et al. | 382/100 |
| 6,360,014 | B1 * | 3/2002 | Boon | 382/233 |
| 6,381,275 | B1 | 4/2002 | Fukuhara et al. | |
| 6,415,055 | B1 | 7/2002 | Kato | |
| 6,738,528 | B1 | 5/2004 | Nio et al. | |

FOREIGN PATENT DOCUMENTS

| | | |
|---|---|---|
| JP | 5308623 | 11/1993 |
| JP | 8084342 | 3/1996 |

OTHER PUBLICATIONS

Japanese Office Action dated Oct. 31, 2006.

* cited by examiner

*Primary Examiner*—Negussie Worku
(74) *Attorney, Agent, or Firm*—Harness, Dickey & Pierce, P.L.C.

(57) ABSTRACT

[The present invention relates to an image processing technique, and in particular to a method for restoring a compressed image by using a hybrid motion compensation discrete cosine transform (hybrid MC/DCT) mechanism, including: a step of defining a smoothing functional having a smoothing degree of an image and reliability for an original image by pixels having an identical property in image block units; and a step of computing a restored image by performing a gradient operation on the smoothing functional in regard to the original image, thereby preventing the blocking artifacts and the ringing effects in regard to the pixels having an identical property in image blocks.] *In one embodiment, the method includes obtaining a pixel value in a current block and at least one adjacent pixel value. A type of the current block is one of an intra-coded type and inter-coded type. A smoothing value of the current block is determined based on the obtained pixel value in the current block and the adjacent pixel value. A pixel value around a boundary of the current block is smoothed based on the type of the current block and the smoothing value.*

5 Claims, 4 Drawing Sheets

METHOD OF DECODING A CURRENT IMAGE

Matter enclosed in heavy brackets [ ] appears in the original patent but forms no part of this reissue specification; matter printed in italics indicates the additions made by reissue.

*DIVISIONAL REISSUE APPLICATIONS*

*Notice: More than one reissue application has been filed for the reissue of U.S. Pat. No. 6,611,361. The other reissue applications are application Ser. Nos. 11/212,137, 11/808,423, 11/892,178, 11/892,179, and 11/892,176.*

*DOMESTIC PRIORITY INFORMATION*

*This is a direct divisional of application Ser. No. 11/212,137, filed Aug. 26, 2005; the entire contents of which are hereby incorporated by reference.*

BACKGROUND OF THE INVENTION

1. Field of the Invention

The present invention relates to an image process technique, and in particular to a method for restoring a compressed image by using a hybrid motion compensation discrete cosine transform (hybrid MC/DCT) mechanism, and an apparatus therefor.

2. Description of the Background Art

In general, image compression techniques, such as MPEG1 and MPEG2 employ a hybrid motion compensation discrete cosine transform (hereinafter, referred to as "hybrid MC/DCT") mechanism in order to improve compression efficiency. The hybrid MC/DCT mechanism is roughly divided into an encoding process and a decoding process. In the encoding process, an original image is divided into a plurality of blocks in order to compress information in a spatial section, a second-dimensional discrete cosine transform is performed on each block, and redundancy information in the image or between the images is reduced by using the correlation on a time axis among the images in order to decrease information in a temporal section. In the decoding process, the steps of the encoding process are performed in a reverse order. An encoder and a decoder are necessary to carry out the hybrid MC/DCT mechanism.

FIG. 1 is a block diagram illustrating an image encoder according to a related art. As shown therein, an input image signal is subtracted from an image signal moved from and compensated by an image memory 9, passed through a first switching unit 2, and inputted to a DCT unit 3. The DCT unit 3 performs a discrete cosine transform on the inputted image signal. A quantization unit 4 quantizes the image signal, and outputs a DCT coefficient (q). An inverse quantization unit 6 inversely quantizes the DCT coefficient (q), and an inverse DCT unit 7 carries out an inverse discrete cosine transform thereon, thereby restoring the original image signal. The restored image signal is added to an image signal restored in a previous stage by an adder 8, and inputted to an image memory 9. A controller 5 controls switching of the first and second switching units 2, 10, and transmits INTRA/INTER information (p=mtype; flag for INTRA/INTER), transmission information (t; flag for transmitted or not), and quantization information (qz=Qp; quantizer indication) to a decoder (not shown in FIG. 1). The image memory 9 outputs a motion vector information (v=MV; motion vector) to the decoder. The DCT unit 3 outputs the DCT coefficient (q) to the decoder.

However, information of the original image signal is lost during the process of coding the image signal described above, especially during the quantization process, thereby causing blocking artifacts and ringing effects to the image which is reconstructed in the decoder. The blocking artifacts imply irregularity between the blocks generated due to information loss resulting from the quantization of the low-frequency DCT coefficients, and the ringing effects result from quantization errors of the high-frequency DCT coefficients.

That is, in accordance with a coding technique using the DCT in a coding system of a static image or dynamic image, an image is divided into a plurality of blocks, and the DCT is performed on each block. On the other hand, when the DCT is carried out on the original image, its important information is mainly included in low-frequency elements, and becomes lesser in high-frequency elements. Furthermore, the low-frequency elements include a lot of information relating to adjacent blocks. The DCT does not consider the correlation between the blocks, and quantizes the low-frequency elements by blocks, thereby destroying continuity of the adjacent blocks. It is called the blocking artifacts.

In addition, when the coefficients obtained by performing the DCT are quantized, as a quantization interval is increased, the elements to be coded are decreased, and thus the number of the bits to be processed is reduced. As a result, the information of the high-frequency element included in the original image is reduced, thereby generating distortion of the reconstructed image. It is called the ringing effects. The ringing effects generated by increasing the quantization interval are serious especially in a contour of an object in the reconstructed image.

As techniques for removing the blocking artifacts and the ringing effects, employed are a low pass filtering method and a regularized image restoration method.

According to the low pass filtering method, a plurality of pixels around a predetermined pixel are selected, and an average value thereof is computed. Here, a filter tap or filter coefficients are set by experience. For example, referring to FIG. 2, there is provided a block of N*N size. Reference numerals A to F depict pixels. Pixels C, D are adjacent to a boundary of the block. In order to reduce irregular variations between the pixels C, D, a k-tap (here, 7-tap) filtering is performed, and a threshold value replacing a D pixel value is computed according to local statistics. There is an advantage in that a computation amount is reduced by utilizing a predetermined threshold value according to the comparison with the local statistics. However, an adaptive processing power in accordance with a quantization parameter is deficient, and thus a screen quality of the restored image is excessively smoothed according to the kind of the images and compression ratio.

The regularized image restoration method adaptively deals with the blocking artifacts in accordance with statistical properties of the image. That is, irregular information around the boundary of the block or in the block is all computed. However, the computed values form a matrix shape, and thus a real time processing is difficult due to the great computation amount. In addition, an average value obtained by a computation result of the irregular information is equally applied to the pixels, regardless of a degree of irregularity. Accordingly, when a block has a high degree of irregularity, it can be reduced. However, in case of a block having a low degree of irregularity, it may be increased. Thus, the system is not adaptive. Also, the information in the temporal section is not processed, and thus irregularity between the images cannot be adaptively processed.

SUMMARY OF THE INVENTION

[It is therefore an object of the present invention to provide a method for restoring a compressed image of an image processing system and an apparatus therefor which can reduce the blocking artifacts and ringing effects generated in a restored image signal.]

[It is another object of the present invention to provide a method for restoring a compressed image of an image processing system and an apparatus therefor which consider a smoothing degree of an image and reliability for an original image by pixels having an identical property in image block units, during a decoding process.]

[In order to achieve the above-described objects of the present invention, there is provided a method for restoring a compressed image of an image processing system including: a step of defining a smoothing functional having a degree of smoothing an image and reliability for an original image by pixels having an identical property in image block units; and a step of computing a restored image by performing a gradient operation on the smoothing functional in regard to the original image.]

[These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.]

*The present invention relates to a method of decoding a current image.*

*In one embodiment, the method includes obtaining a pixel value in a current block and at least one adjacent pixel value. A type of the current block is one of an intra-coded type and inter-coded type. A smoothing value of the current block is determined based on the obtained pixel value in the current block and the adjacent pixel value. A pixel value around a boundary of the current block is smoothed based on the type of the current block and the smoothing value.*

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1:
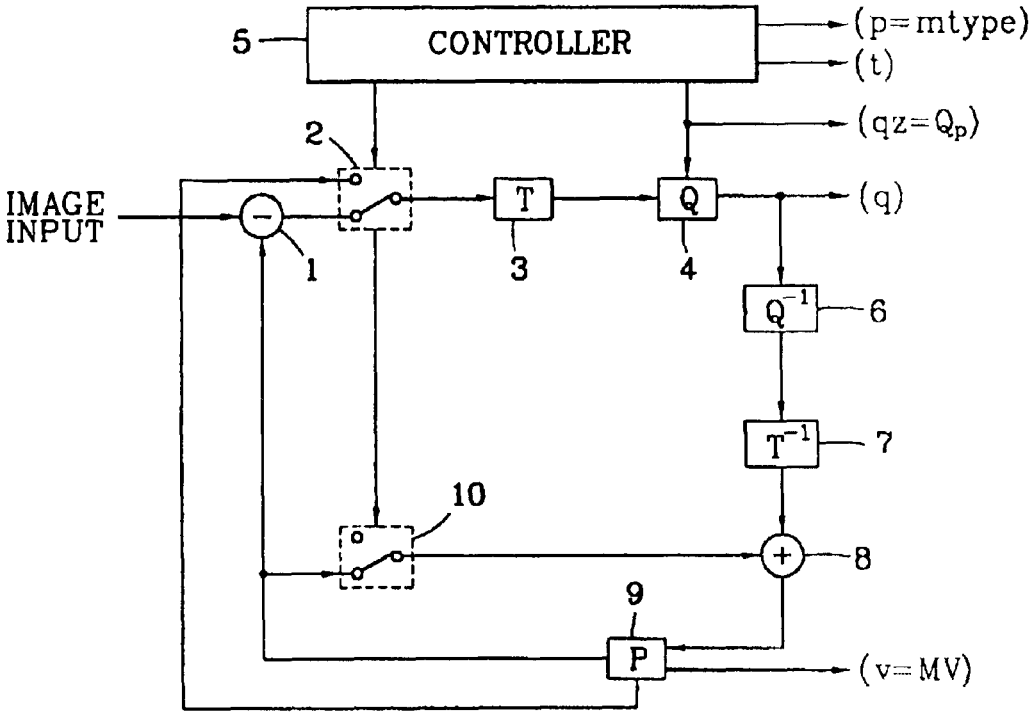
FIG. 1 RELATED ART
FIG. 1 is a block diagram illustrating an image encoder according to a related art.
Figure 2:
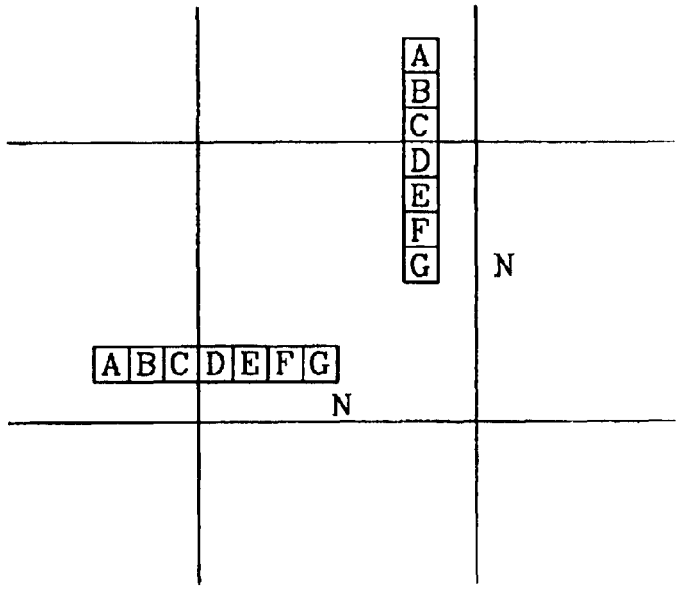
FIG. 2 RELATED ART
FIG. 2 illustrates pixels in order to explain a low pass filtering method carried out in the image encoder of FIG. 1.
Figure 3:
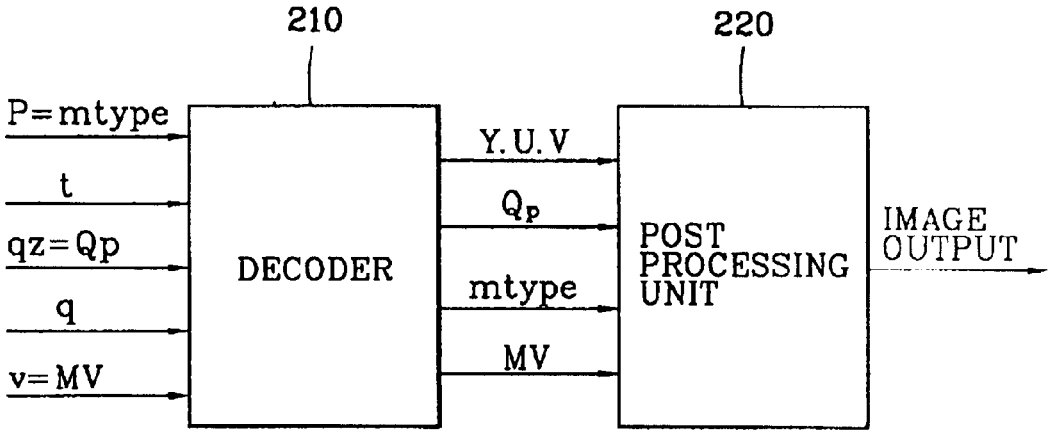
FIG. 3 is a block diagram illustrating an apparatus for restoring a compressed image of an image processing system in accordance with an embodiment of the present invention.

FIG. 3 is a block diagram illustrating an apparatus for restoring a compressed image of an image processing system in accordance with the present invention. As shown therein, a decoder 210 receives INTRA/INTER information (p=mtype), transmission information (t), quantization information (qz=Qp), a discrete cosine transform (DCT) coefficient (q) and motion vector information (v=MV; motion vector) from an encoder (as depicted in FIG. 1), and performs decoding. The encoder and the decoder 210 are connected by a communication channel or network. A post processing unit 220 receives image signals Y, U, V, a quantization variable (qz=Qp), a macro block type (mtype) and a motion vector (v=MV) from the decoder 210, and carries out an operation of restoring the compressed image in accordance with the present invention.

According to the present invention, a smoothing functional is defined in regard to pixels having an identical property by blocks, a regularization parameter is computed based on the smoothing functional, and available values are applied to the regularization parameter, thereby obtaining an image to be restored. Thereafter, an iterative technique, a discrete cosine transform (DCT), a projection and an inverse DCT are sequentially performed on the obtained image, thereby restoring a similar image to the original image. The whole processes will now be described in detail.

Definition of Smoothing Functional

When an original image (f) is compressed and transmitted, an image (g) reconstructed in the decoder 210 is represented by the following equation.

$$g=f+n \tag{1}$$

Here, "g" and "f" indicate row vectors re-arranged in a stack-order, namely a scanning order, and "n" indicates a quantization error. When it is presumed that a size of the image is M×M, the original image (f), the reconstructed image (g) and (n) are column vectors having a size of M×1.

An original pixel for the original image (f) is represented by f(i,j). Here, "i" and "j" indicate a position of the pixel in the image.

Figure 4:
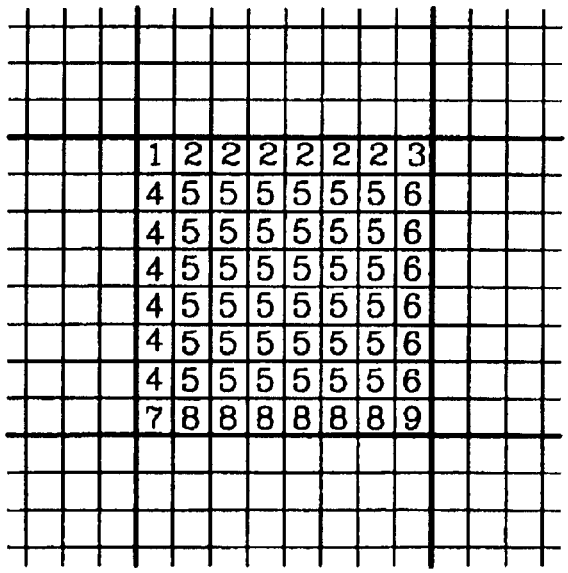
FIG. 4 illustrates an example of a configuration of original pixels in a block of an original image in accordance with the present invention.

FIG. 4 illustrates configuration of the original pixels f(i,j) in the block of the original image (f) in order to explain the present invention. Reference numerals in FIG. 4 depict information of the respective pixels. 8×8 pixels are shown in a single block.

The 8×8 pixels in the block are classified into the pixels having an identical property. That is, the pixels are divided in accordance with their position, vertical direction, horizontal direction and smoothing variation in the temporal section. Accordingly, it is defined that a set of the pixels positioned at a boundary of the block in a vertical direction is $C_{VB}$, a set of the pixels positioned inside the block in the vertical direction is $C_{VW}$, a set of the pixels positioned at a boundary of a block in a horizontal direction is $C_{HB}$, a set of the pixels positioned inside the block in the horizontal direction is $C_{HW}$, and a set of the pixels moved and compensated in the temporal section is $C_T$. The sets $C_{VB}$, $C_{VW}$, $C_{HB}$, $C_{HW}$, $C_T$ are represented by the following expressions.

$$\begin{aligned}
C_{VB}&=\{f(i,j): i \bmod 8=0,1, \text{ and } j=0,1,\ldots,M-1\}\\
C_{VW}&=\{f(i,j): i \bmod 8\neq 0,1, \text{ and } j=0,1,\ldots,M-1\}\\
C_{HB}&=\{f(i,j): j \bmod 8=0,1, \text{ and } i=0,1,\ldots M-1\}\\
C_{HW}&=\{f(i,j): j \bmod 8\neq 0,1, \text{ and } i=0,1,\ldots,M-1\}\\
C_T&=\{f(i,j): f(i,j)\in MB_{inter} \text{ or } f(i,j)\in MB_{not\ coded}\}
\end{aligned} \tag{2}$$

Here, the set $C_T$ is a set of the pixels having a macro block type of "inter" or "not coded" in order to remove temporal redundancy information.

The smoothing functional M(f) for using the regularization restoration method from the above-defined sets $C_{VB}$, $C_{VW}$, $C_{HB}$, $C_{HW}$, $C_T$ is defined as follows.

$$M(f)=M_{VB}(f)+M_{HB}(f)+M_{VW}(f)+M_{HW}(f)+M_T(f) \tag{3}$$

Here, $M_{VB}(f)$ is a smoothing functional for the set $C_{VB}$, $M_{HB}(f)$ is a smoothing functional for $C_{HB}$, $M_{VW}(f)$ is a smoothing functional for the set $C_{VW}$, $M_{HW}(f)$ is a smoothing functional for the set $C_{HW}$, and $M_T(f)$ is a smoothing functional for the set $C_T$. The smoothing functionals are respectively defined as follows.

$$M_{VB}(f)=\|Q_{VB}f\|^2+\alpha_{VB}\|g-f\|_{W1}^2$$

$$M_{HB}(f)=\|Q_{HB}f\|^2+\alpha_{HB}\|g-f\|_{W2}^2$$

$$M_{VW}(f)=\|Q_{VW}f\|^2+\alpha_{VW}\|g-f\|_{W3}^2$$

$$M_{HW}(f)=\|Q_{HW}f\|^2+\alpha_{HW}\|g-f\|_{W4}^2$$

$$M_T(f)=\|Q_Tf\|^2+\alpha_T\|g-f\|_{W5}^2$$

Here, first terms in each expression indicate a smoothing degree for the original pixel (reference pixel) and adjacent pixel, and second terms indicate reliability for the original pixel and the restored pixel. "‖.‖" indicates the Euclidean norm. $Q_{VB}$, $Q_{VW}$, $Q_{HB}$, $Q_{HW}$, $Q_T$ indicate high pass filters for smoothing the pixels in the sets $C_{VB}$, $C_{VW}$, $C_{HB}$, $C_{HW}$, $C_T$.

The first term at the right side is represented by the following expression.

$$\|Q_{VB}f\|^2 = \sum_{n=0}^{M-1}\sum_{m}(f(m,n)-f(m-1,n))^2,\ m=0,8,16,\ldots \tag{5}$$

$$\|Q_{HB}f\|^2 = \sum_{n}\sum_{m=0}^{M-1}(f(m,n)-f(m,n-1))^2,\ n=0,8,16,\ldots$$

$$\|Q_{VW}f\|^2 = \sum_{n=0}^{M-1}\sum_{m}(f(m,n)-f(m-1,n))^2,\ m\neq 0,8,16,\ldots$$

$$\|Q_{HW}f\|^2 = \sum_{n}\sum_{m=0}^{M-1}(f(m,n)-f(m,n-1))^2,\ n\neq 0,8,16,\ldots$$

$$\|Q_Tf\|^2 = \sum_{n}\sum_{m}(f_{MC}(m,n)-f(m,n))^2$$

The smoothing functionals represented by Expression (4) are quadratic equations, respectively. Thus, local minimizers of each smoothing functional become global minimizers.

Figure 5:
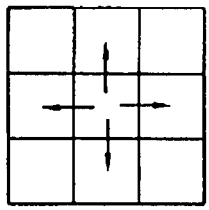
FIG. 5 illustrates directions of the irregular smoothing degree of the pixels in accordance with the present invention.

FIG. 5 illustrates directions of the irregular smoothing degree of the pixels. There are a single pixel at the center and eight pixels therearound. There are also shown horizontal and vertical arrows starting from the pixel at the center. The arrows respectively depict the directions of the irregular smoothing degree in regard to the four adjacent pixels. That is to say, the irregular smoothing degree is considered in four directions in respect of a single pixel.

Figure 6:
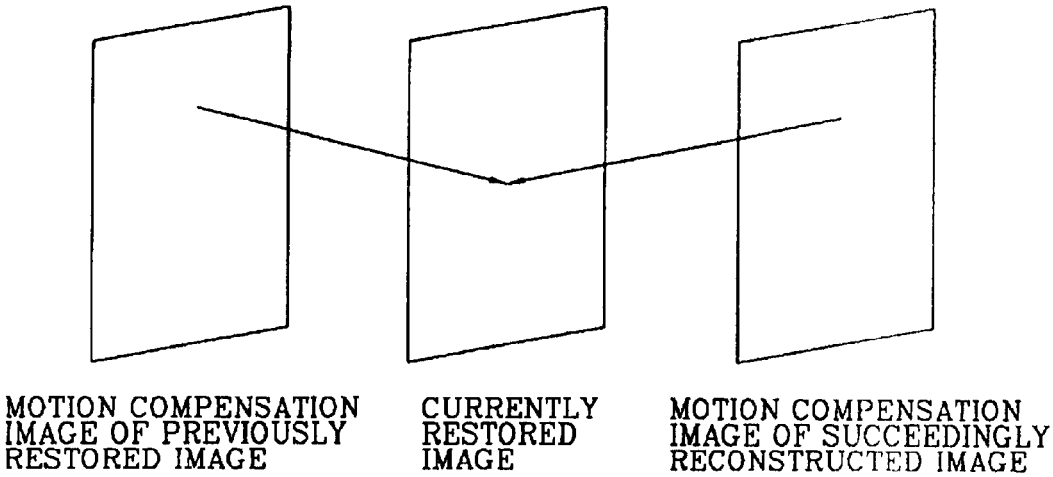
FIG. 6 illustrates an image moved and compensated in regard to a temporal section in accordance with the present invention.

FIG. 6 illustrates an image moved and compensated in regard to the temporal section in accordance with the present invention. Arrows depict the correlation of a currently-restored image with a previously-restored image and a succeedingly reconstructed image, respectively.

$\alpha_{VB}$, $\alpha_{HB}$, $\alpha_{VW}$, $\alpha_{HW}$, $\alpha_T$ included in the second terms of Expression (4) are regularization parameters in regard to each set, indicate a ratio of the smoothing degree and reliability, and imply an error element. W1, W2, W3, W4, W5 indicate diagonal matrixes having a size of M×M in order to determine whether each set has an element, and have a value of "1", or "0" according to whether each pixel is included in a corresponding set. That is, if the respective pixels are included in the corresponding sets, the value of the diagonal elements is "0". If not, the value of the diagonal elements is Thereafter, the regularization parameters, $\alpha_{VB}$, $\alpha_{HB}$, $\alpha_{VW}$, $\alpha_{HW}$, $\alpha_T$ are approximated as follows.

Approximation of Regularization Parameters

Approximation of the regularization parameters is a major element determining performance of the smoothing functional. In order to reduce the computation amount, presumptions are made as follows.

(1) A maximum value of the quantization error generated in the quantization process of the DCT region is Qp, and thus it is presumed that the quantization variables Qp are regular in each macro block. For this, the maximum quantization error of the DCT coefficients of each macro block is regularly set to be Qp.

(2) It is also presumed that the DCT quantization errors have the Gaussain distribution property in the spatial section.

Under the above presumptions, in case a set theoretic is applied, each regularization parameter is approximated as follows.

$$\alpha_{VB} = \frac{\|Q_{VB}f\|^2}{\|g-f\|_{W1}^2} = \frac{\|Q_{VB}g\|^2}{\|g-f\|_{W1}^2} = \frac{\|Q_{VB}g\|^2}{\sum_n\sum_m w_1(m,n)Qp^2(m,n)} \tag{6}$$

$$\alpha_{HB} = \frac{\|Q_{HB}f\|^2}{\|g-f\|_{W2}^2} = \frac{\|Q_{HB}g\|^2}{\|g-f\|_{W2}^2} = \frac{\|Q_{HB}g\|^2}{\sum_n\sum_m w_2(m,n)Qp^2(m,n)}$$

$$\alpha_{VW} = \frac{\|Q_{VW}f\|^2}{\|g-f\|_{W3}^2} = \frac{\|Q_{VW}g\|^2}{\|g-f\|_{W3}^2} = \frac{\|Q_{VW}g\|^2}{\sum_n\sum_m w_3(m,n)Qp^2(m,n)}$$

$$\alpha_{HW} = \frac{\|Q_{HW}f\|^2}{\|g-f\|_{W4}^2} = \frac{\|Q_{HW}g\|^2}{\|g-f\|_{W4}^2} = \frac{\|Q_{HW}g\|^2}{\sum_n\sum_m w_4(m,n)Qp^2(m,n)}$$

$$\alpha_T = \frac{\|Q_Tf\|^2}{\|g-f\|_{W5}^2} = \frac{\|Q_Tg\|^2}{\|g-f\|_{W5}^2} = \frac{\|Q_Tg\|^2}{\sum_n\sum_m w_5(m,n)Qp^2(m,n)}$$

Here, $Q^2_p(m,n)$ is a quantization variable of a macro block including a (m,n)th pixel of a two-dimensional image.

In Expression (6), denominator terms of the respective regularization parameters are a sum of the energy for the quantization noise of the elements included in each group. As described above, the values of the regularization parameters may be easily computed by applying the set theoretic under the two presumptions.

Computing Pixels to be Restored From Smoothing Functional

Only the original image needs to be computed. However, the smoothing functional includes a square term of the original image. Accordingly, in order to compute the original image, a gradient operation is carried out on the smoothing functional in regard to the original image. A result value thereof is "0", and represented by the following expression.

$$\nabla_f M(f)=2Q^T_{VB}Q_{VB}+2Q^T_{HB}Q_{HB}+2Q^T_{VW}Q_{VW}+2Q^T_{HW}Q_{HW}+2Q^T_TQ_T-2\alpha_{VB}W^T_1W_1(g-f)-2\alpha_{HB}W^T_2W_2(g-f)-2\alpha_{VW}W^T_3W_3(g-f)-2\alpha_{HW}W^T_4W_4(g-f)-2\alpha_T(g-f)=0 \tag{7}$$

Here, a superscript "T" indicates a transposition of the matrix.

A restored image similar to the original image (f) can be obtained by Expression (7). However, operation of an inverse matrix must be performed, and thus the computation amount is increased. Thus, in accordance with the present invention, the restored image is computed by an iterative technique which will now be explained.

Iterative Technique

When Expression (7) is iterated k times, an iterative solution $f_{k+1}$ is represented by the following expression.

$$f_{k+1}=f_k+\beta[Ag-Bf_k],$$
$$A=\alpha_{VB}W_1+\alpha_{HB}W_2+\alpha_{VW}W_3+\alpha_{HW}W_4+\alpha_T W_5 \quad (8)$$
$$B=(Q^T{}_{VB}Q_{VB}+Q^T{}_{HB}Q_{HB}+Q^T{}_{VW}Q_{VW}+Q^T{}_{HW}Q_{HW}+Q^T{}_T Q_T)+A$$

In Expression (8), "β" is a relaxation parameter having a convergence property. Expression (8) can be represented by the following expression by computing consecutive iterative solutions.

$$(f_{k+1}-f_K)=(I-B)(f_k-f_{k-1}) \quad (9)$$

Here, "I" is an identity matrix, and the matrix B has a positive definite property. Therefore, when the following condition is satisfied, the iterative solutions are converged.

$$\|I-B\|<1 \quad (10)$$

Expression (10) can be summarized as follows.

$$0<\beta<\frac{2}{1=\max_i \lambda_i(A)} \quad (11)$$

In Expression (11), "λ(A)" depicts an eigen value of the matrix A. A considerable amount of computation is required to compute the eigen value λ(A). However, the high pass filters have a certain shape determined according to the positions of the respective pixels, regardless of the image. Accordingly, before computing Expression (8), the eigen value λ(A) can be replaced by a fixed value. The value may be computed by a power method which has been generally used in interpretation of numerical values.

For example, a computation process of an eigen value of an iterative solution will now be explained.

$$x_{k+1}=Kx_k$$

Here, "$x_k$" is a vector of M×1, and "K" is a positive-definite symmetric M×M matrix. The eigen value λ' of the matrix K is approximated as follows.

$$\lambda'=\frac{(x_{k+1})^T x_k}{(x_k^T)x_k}$$

In the above expression, if "k" is to infinity, the eigen value λ' is approximated to a real value.

Thus, the iterative solution represented by Expression (8) is computed. The next thing to be considered is a time of finishing the iterative technique, in order to determine the number of iteration. Here, two standards are set as follows.

Firstly, a predetermined threshold value is set before starting iteration, an image obtained after iteration, namely a partially-restored image is compared with the previously-set threshold value, and it is determined whether the iteration technique is continuously performed according to a comparison result.

Secondly, the iteration technique is performed as many as a predetermined number, and then finished.

According to the first standard, a predetermined threshold value is set to performing iteration, and thus a wanted value is obtained. However, although the iteration number is increased, it may happen that the predetermined threshold value is not reached. On the other hand, the second standard is performed by experience, but can reduce a computation amount. Therefore, the two standards may be selectively used according to the design specification.

Figure 7:
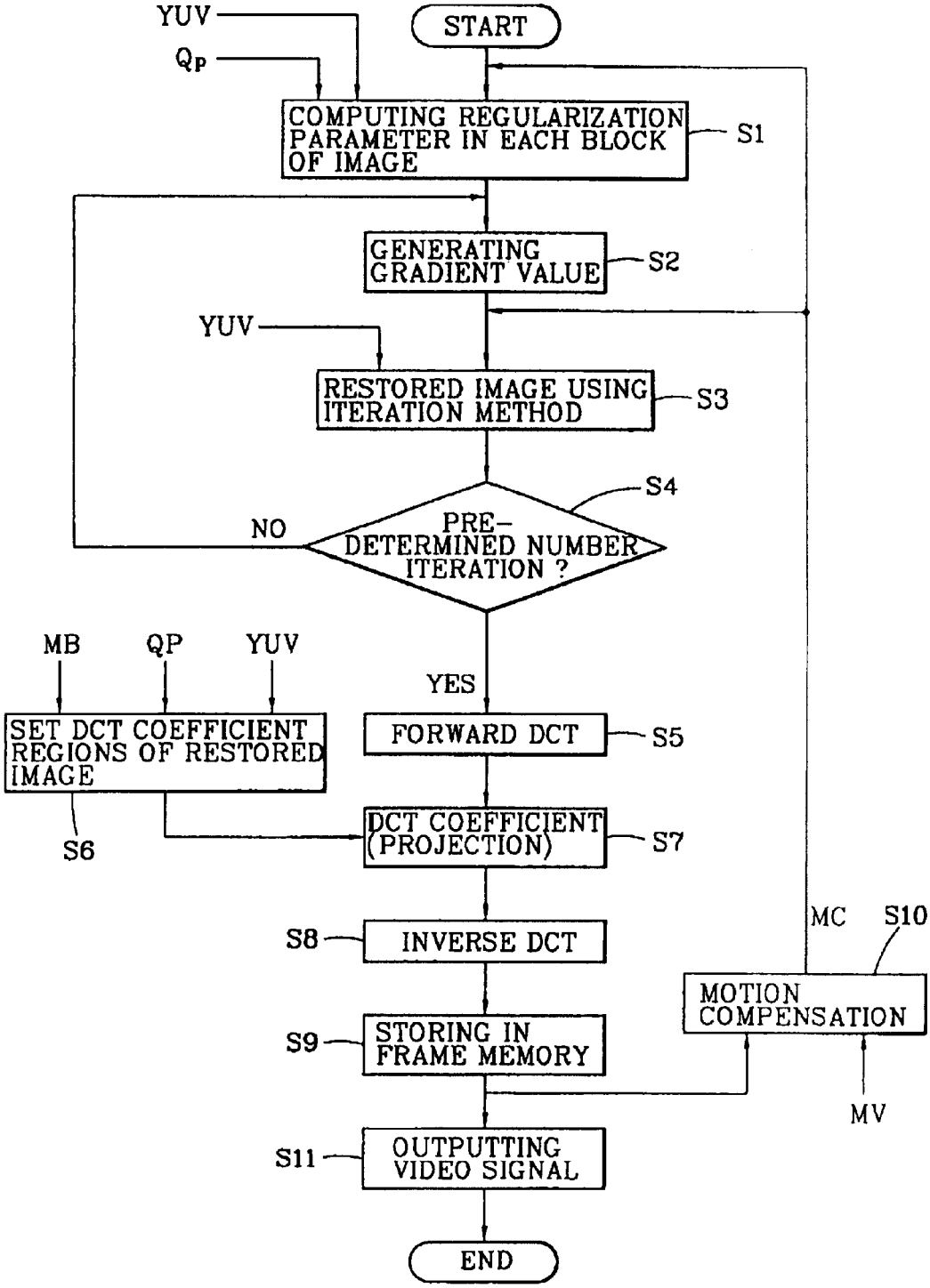
FIG. 7 illustrates a flowchart of the apparatus for restoring the compressed image of the image processing system in accordance with an embodiment of the present invention.

FIG. 7 is a flowchart of the apparatus for restoring the compressed image of the image processing system in accordance with the present invention. As shown therein, in the step S1, the quantization variable Qp and the image signals Y, U, V are inputted, and the regularization parameter is approximated as described above. In the step S2, the gradient operation is performed on the smoothing functional in regard to the original image. In the step S3, an iterative solution, namely a wanted restored image is obtained by the iteration technique. In this step, employed are the image signals Y, U, V and the motion vector MV which is moved and compensated.

In the step S4, the DCT is performed on the restored image corresponding to the iterative solution $f_{k+1}$ obtained in the step S3. An (u,v)th DCT coefficient of the two-dimensional restored image is expressed as $F_{k+1}(u,v)$, and must exist in the following section in accordance with a property of the quantization process.

$$G(u,v)-Qp \leqq F_{k+1}(u,v) \leqq G(u,v)+Qp \quad (12)$$

Here, "Qp" is a maximum quantization error as explained above, and "G(u,v)" is a two-dimensional DCT coefficient obtained by performing the DCT on the reconstructed image (g). The DCT coefficients $F_{k+1}(u,v)$ and G(u,v) are represented as follows. In Expression (13), "B" indicates a block DCT.

$$F_{k+1}(u,v)=(Bf_{k+1})(u,v), \text{ and } G(u,v)=(Bg)(u,v) \quad (13)$$

In the step S6, a section of the DCT coefficient of the restored image is set as in Expression (12). Accordingly, in case the DCT coefficient $F_{k+1}(u,v)$ of the restored image is not in the predetermined section, it must be projected as follows. A projection process is carried out in the step S7, and represented by Expression (14).

$$P(F_{k+1}(u,v))=G(u,v)-Qp, \text{ if } F_{k+1}(u,v)<G(u,v)-Qp$$
$$P(F_{k+1}(u,v))=G(u,v)+Qp, \text{ if } F_{k+1}(u,v)>G(u,v)-Qp \quad 14$$
$$P(F_{k+1}(u,v))=F_{k+1}(u,v), \text{ otherwise.}$$

Expression (14) will now be described.

When $F_{k+1}(u,v)$ is smaller than G(u,v)−Qp, the projected restored image $P(F_{k+1}(u,v))$ is mapped to G(u,v)−Qp. In case $F_{k+1}(u,v)$ is greater than G(u,v)+Qp, the projected restored image $P(F_{k+1}(u,v))$ is mapped to G(u,v)+Qp. Otherwise, the projected restored image $P(F_{k+1}(u,v))$ is mapped as it is.

In the step S8, the inverse DCT is performed on the mapped image $P(F_{k+1}(u,v))$ in the spatial section. The finally restored image is represented by Expression (14).

$$f_{k+1}=B^T PBf_{k+1} \quad (15)$$

Here, "B" indicates the DCT, "P" indicates mapping, and "$B^T$" indicates the inverse DCT.

The restored image is stored in a frame memory in the post processing unit 220 (Step S9). The post processing unit 220 performs motion compensation based on the motion vector MV (Step S10). The motion and compensation image is employed for generation of the regularization parameter for a succeeding image and the iteration technique.

The post processing unit 220 outputs the restored motion and compensation image as a video signal to a display (not shown) (Step S11).

As discussed earlier, the present invention can restrict a section of the restored image for the respective pixels by using the various regularization parameters. In addition, the present invention prevents flickering which may occur in the dynamic image compression technique.

Consequently, the present invention adaptively prevents the blocking artifacts and the ringing effects for the pixels having an identical property in image block units, and thus can be widely used for the products of the hybrid MC-DCT mechanism.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

[1. A method for restoring a compressed image of an image processing system, comprising:

a step for defining a smoothing functional having a smoothing degree of an image and reliability for an original image by pixels having an identical property in image block units; and a step for computing a restored image by performing a gradient operation on the smoothing functional in regard to the original image;

wherein the smoothing functional M(f) comprises a sum of a smoothing functional $M_{VB}(f)$ for pixels positioned at the boundary of a block in a vertical direction, a smoothing functional $M_{VW}(f)$ for pixels positioned inside the block in a horizontal direction, a smoothing functional $M_{HB}(f)$ for pixels positioned at the boundary of a block in a horizontal direction, a smoothing functional $M_{HW}(f)$ for pixels positioned inside the block in a horizontal direction, a smoothing functional $M_T(f)$ for pixels moved and compensated in the temporal section, "f" indicating the original image.]

[2. The method according to claim 1, wherein the step for defining the smoothing functional divides the pixels according to their position, horizontal direction, vertical direction and smoothing variation in a temporal section.]

[3. The method according to claim 1, wherein the smoothing functionals $M_{VB}(f)$, $M_{HB}(f)$, $M_{VW}(f)$, $M_{HW}(f)$, $M_T(f)$ are defined as;

$$M_{VB}(f)=\|Q_{VB}f\|^2+\alpha_{VB}\|g-f\|_{W1}^2$$

$$M_{HB}(f)=\|Q_{HB}f\|^2+\alpha_{HB}\|g-f\|_{W2}^2$$

$$M_{VW}(f)=\|Q_{VW}f\|^2+\alpha_{VW}\|g-f\|_{W3}^2$$

$$M_{HW}(f)=\|Q_{HW}f\|^2+\alpha_{HW}\|g-f\|_{W4}^2$$

$$M_T(f)=\|Q_Tf\|^2+\alpha_T\|g-f\|_{W5}^2$$

$Q_{VB}$, $Q_{VW}$, $Q_{HB}$, $Q_{HW}$, $Q_T$ indicating high pass filters for smoothing the respective pixels, $\alpha_{VB}$, $\alpha_{VW}$, $\alpha_{HB}$, $\alpha_{HW}$, $\alpha_T$ being regularization parameters, g being a reconstructed image, and W1, W2, W3, W4, W5 indicating diagonal matrixes for determining whether each group has an element.]

[4. The method according to claim 1, wherein the step for computing the restored image comprises a step for approximating the regularization parameter by applying a set theoretic, and it is presumed that the quantization variables of the DCT region regular in each macro block, and also presumed that the DCT quantization errors have the Gaussain distribution property in the spatial section.]

[5. The method according to claim 4, wherein the regularization parameters are approximated as;

$$\alpha_{VB}=\frac{\|Q_{VB}f\|^2}{\|g-f\|_{W1}^2}=\frac{\|Q_{VB}g\|^2}{\|g-f\|_{W1}^2}=\frac{\|Q_{VB}g\|^2}{\sum_n\sum_m w_1(m,n)Qp^2(m,n)}$$

$$\alpha_{HB}=\frac{\|Q_{HB}f\|^2}{\|g-f\|_{W2}^2}=\frac{\|Q_{HB}g\|^2}{\|g-f\|_{W2}^2}=\frac{\|Q_{HB}g\|^2}{\sum_n\sum_m w_2(m,n)Qp^2(m,n)}$$

$$\alpha_{VW}=\frac{\|Q_{VW}f\|^2}{\|g-f\|_{W3}^2}=\frac{\|Q_{VW}g\|^2}{\|g-f\|_{W3}^2}=\frac{\|Q_{VW}g\|^2}{\sum_n\sum_m w_3(m,n)Qp^2(m,n)}$$

$$\alpha_{HW}=\frac{\|Q_{HW}f\|^2}{\|g-f\|_{W4}^2}=\frac{\|Q_{HW}g\|^2}{\|g-f\|_{W4}^2}=\frac{\|Q_{HW}g\|^2}{\sum_n\sum_m w_4(m,n)Qp^2(m,n)}$$

$$\alpha_T=\frac{\|Q_Tf\|^2}{\|g-f\|_{W5}^2}=\frac{\|Q_Tg\|^2}{\|g-f\|_{W5}^2}=\frac{\|Q_Tg\|^2}{\sum_n\sum_m w_5(m,n)Qp^2(m,n)}$$

$Q^2_p(m,n)$ indicating a quantization variable of a macro block including an (m,n)th pixel of a two-dimensional image.]

[6. The method according to claim 1, wherein a local minimizer of the smoothing functional is a global minimizer.]

[7. The method according to claim 1, wherein the regularization parameter indicates a ratio of a smoothing degree of the image and reliability for the original image.]

[8. The method according to claim 1, further comprising a step for computing an iterative solution in regard to a restored image, after computing the restored image.]

[9. The method according to claim 8, wherein the iterative solution $f_{k+1}$ is represented by;

$$f_{k+1}=f_k+\beta[Ag-Bf_k],$$

$$A=\alpha_{VB}W_1+\alpha_{HB}W_2+\alpha_{VW}W_3+\alpha_{HW}W_4+\alpha_TW_5$$

$$B=(Q^T_{VB}Q_{VB}+Q^T_{HB}Q_{HB}+Q^T_{VW}Q_{VW}+Q^T_{HW}Q_{HW}+Q^T_TQ_T)+A$$

and, β is a relaxation parameter having a convergence property, and computed at the range of $$0<\beta<\frac{2}{1=\max_i\lambda_i(A)},$$

an eigen value λ(A) of the matrix A being replaced by a fixed value.]

[10. The method according to claim 8, wherein a predetermined threshold value is set in computing an iterative solution, an image obtained after iteration is compared with the previously-set threshold value, and it is determined whether the iteration technique is continuously performed according to a comparison result, or the iteration is finished after the iteration technique is performed as many as a previously-set number.]

[11. The method according to claim 8, further comprising a step for obtaining a mapped image by projecting a two-dimensional DCT coefficient of the restored image corresponding to a computed iterative solution, and for performing an inverse DCT on the mapped image.]

[12. The method according to claim 11, wherein the step for obtaining the mapped image is mapping a projected restored image $P(F_{k+1}(u,v))$ to $G(u,v)-Qp$ when the DCT coefficient of the restored image $F_{k+1}(u,v)$ is smaller than $G(u,v)-Qp$, mapping the projected restored image $P(F_{k+1}(u,v))$ to $G(u,v)+Qp$ when $F_{k+1}(u,v)$ is greater than $G(u,v)+Qp$, and otherwise mapping the projected restored image $P(F_{k+1}(u,v))$ as it is, $G(u,v)$ indicating a two-dimensional DCT coefficient obtained by performing the DCT on the reconstructed image, and Qp indicating quantization information.]

[13. The method according to claim 1, wherein a predetermined threshold value is set in computing an iterative solution, an image obtained after iteration is compared with the previously-set threshold value, and it is determined whether the iteration technique is continuously performed according to a comparison result, or the iteration is finished after the iteration technique is performed as many as a previously-set number.]

[14. The method according to claim 1, further comprising a step for obtaining a mapped image by projecting a two-dimensional DCT coefficient of the restored image corresponding to a computed iterative solution, and for performing an inverse DCT on the mapped image.]

[15. The method according to claim 14, wherein the step for obtaining the mapped image is mapping a projected restored image $P(F_{k+1}(u,v))$ to $G(u,v)-Qp$ when the DCT coefficient of the restored image $F_{k+1}(u,v)$ is smaller than $G(u,v)-Qp$, mapping the projected restored image $P(F_{k+1}(u,v))$ to $G(u,v)+Qp$ when $F_{k+1}(u,v)$ is greater than $G(u,v)+Qp$, and otherwise mapping the projected restored image $P(F_{k+1}(u,v))$ as it is, $G(u,v)$ indicating a two-dimensional DCT coefficient obtained by performing the DCT on the reconstructed image, and Qp indicating quantization information.]

[16. An apparatus for restoring a compressed image of an image processing system, comprising:

a decoder for decoding a coded image signal, and for outputting information of the restored image, such as the decoded image, a quantization variable, a macro block type and a motion vector; and a post processing unit for including the information of the restored image inputted from the image decoder, for defining a smoothing functional including a sum of a smoothing functional $M_{VB}(f)$ for pixels positioned at the boundary of a block in a vertical direction, a smoothing functional $M_{VW}(f)$ for pixels positioned inside the block in a horizontal direction, a smoothing functional $M_{HB}(f)$ for pixels positioned at the boundary of a block in a horizontal direction, a smoothing functional $M_{HW}(f)$ for pixels positioned inside the block in a horizontal direction, a smoothing functional $M_T(f)$ for pixels moved and compensated in the temporal section, "f" indicating the original image, and for performing a gradient operation on the smoothing functional in regard to the original image, the smoothing functional including a regularization parameter having weight of reliability for the original image.]

[17. A method for restoring a compressed image of an image processing system, comprising:

a step for defining a smoothing functional having a smoothing degree of an image and reliability for an original image by pixels having an identical property in image block units;

a step for computing a restored image by performing a gradient operation on the smoothing functional in regard to the original image; and a step for computing an iterative solution in regard to the restored image, after computing the restored image.]

[18. The method according to claim 17, wherein the step for defining the smoothing functional divided the pixels according to their position, horizontal direction, vertical direction and smoothing variation in a temporal section.]

[19. The method according to claim 17, wherein the smoothing functional M(f) comprises a sum of a smoothing functional $M_{VB}(f)$ for pixels positioned at the boundary of a block in a vertical direction, a smoothing functional $M_{VW}(f)$ for pixels positioned inside the block in a horizontal direction, a smoothing functional $M_{HB}(f)$ for pixels positioned at the boundary of a block in a horizontal direction, a smoothing functional $M_{HW}(f)$ for pixels positioned inside the block in a horizontal direction, a smoothing functional $M_T(f)$ for pixels moved and compensated in the temporal section, "f" indicating the original image.]

[20. The method according to claim 19, wherein the smoothing functionals $M_{VB}(f)$, $M_{HB}(f)$, $M_{VW}(f)$, $M_{HW}(f)$, $M_T(f)$ are defined as;

$$M_{VB}(f)=\|Q_{VB}f\|^2+\alpha_{VB}\|g-f\|_{W1}^2$$

$$M_{HB}(f)=\|Q_{HB}f\|^2+\alpha_{HB}\|g-f\|_{W2}^2$$

$$M_{VW}(f)=\|Q_{VW}f\|^2+\alpha_{VW}\|g-f\|_{W3}^2$$

$$M_{HW}(f)=\|Q_{HW}f\|^2+\alpha_{HW}\|g-f\|_{W4}^2$$

$$M_T(f)=\|Q_Tf\|^2+\alpha_T\|g-f\|_{W5}^2$$

$Q_{VB}$, $Q_{VW}$, $Q_{HB}$, $Q_{HW}$, $Q_T$ indicating high pass filters for smoothing the respective pixels, $\alpha_{VB}$, $\alpha_{VW}$, $\alpha_{HB}$, $\alpha_{HW}$, $\alpha_T$ being regularization parameters, g being a reconstructed image, and W1, W2, W3, W4, W5 indicating diagonal matrixes for determining whether each group has an element.]

[21. The method according to claim 17, wherein the step for computing the restored image comprises a step for approximating the regularization parameter by applying a set theoretic, and it is presumed that the quantization variables of the DCT region are regular in each macro block, and also presumed that the DCT quantization errors have the Gaussain distribution property in the spatial section.]

[22. The method according to claim 21, wherein the regularization parameters are approximated as;

$$\alpha_{VB}=\frac{\|Q_{VB}f\|^2}{\|g-f\|_{W1}^2}=\frac{\|Q_{VB}g\|^2}{\|g-f\|_{W1}^2}=\frac{\|Q_{VB}g\|^2}{\sum_n\sum_m w_1(m,n)Qp^2(m,n)}$$

$$\alpha_{HB}=\frac{\|Q_{HB}f\|^2}{\|g-f\|_{W2}^2}=\frac{\|Q_{HB}g\|^2}{\|g-f\|_{W2}^2}=\frac{\|Q_{HB}g\|^2}{\sum_n\sum_m w_2(m,n)Qp^2(m,n)}$$

$$\alpha_{VW}=\frac{\|Q_{VW}f\|^2}{\|g-f\|_{W3}^2}=\frac{\|Q_{VW}g\|^2}{\|g-f\|_{W3}^2}=\frac{\|Q_{VW}g\|^2}{\sum_n\sum_m w_3(m,n)Qp^2(m,n)}$$

$$\alpha_{HW}=\frac{\|Q_{HW}f\|^2}{\|g-f\|_{W4}^2}=\frac{\|Q_{HW}g\|^2}{\|g-f\|_{W4}^2}=\frac{\|Q_{HW}g\|^2}{\sum_n\sum_m w_4(m,n)Qp^2(m,n)}$$

$$\alpha_T=\frac{\|Q_Tf\|^2}{\|g-f\|_{W5}^2}=\frac{\|Q_Tg\|^2}{\|g-f\|_{W5}^2}=\frac{\|Q_Tg\|^2}{\sum_n\sum_m w_5(m,n)Qp^2(m,n)}$$

$Q^2_p(m,n)$ indicating a quantization variable of a macro block including an (m,n)th pixel of a two-dimensional image.]

[23. The method according to claim 17, wherein a local minimizer of the smoothing functional is a global minimizer.]

[24. The method according to claim 17, wherein the regularization parameter indicates a ratio of a smoothing degree of the image and reliability for the original image.]

[25. The method according to claim 17, wherein the iterative solution $f_{k+1}$ is represented by;

$$f_{k+1}=f_k+\beta[Ag-Bf_k],$$

$$A=\alpha_{VB}W_1+\alpha_{HB}W_2+\alpha_{VW}W_3+\alpha_{HW}W_4+\alpha_T W_5$$

$$B=(Q^T{}_{VB}Q_{VB}+Q^T{}_{HB}Q_{HB}+Q^T{}_{VW}Q_{VW}+Q^T{}_{HW}Q_{HW}+Q^T{}_T Q_T)+A$$

and, $\beta$ is a relaxation parameter having a convergence property, and computed at the range of $$0<\beta<\frac{2}{1=\max_i \lambda_i(A)},$$

an eigen value $\lambda(A)$ of the matrix A being replaced by a fixed value.]

[26. An apparatus for restoring a compressed image of an image processing system, comprising:

a decoder for decoding a coded image signal, and for outputting information of the restored image, such as the decoded image, a quantization variable, a macro block type and a motion vector; and a post processing unit for including the information of the restored image inputted from the image decoder, for defining a smoothing functional including a smoothing degree of the image and reliability of an original image block unit, and for performing a gradient operation on the smoothing functional in regard to the original image, the smoothing functional including a regularization parameter having weight of reliability for the original image.]

*27. A method of decoding a current image, comprising:*

*obtaining a pixel value in a current block and at least one adjacent pixel value, a type of the current block being one of an intra-coded type and inter-coded type;*

*obtaining a smoothing value of the current block based on the obtained pixel value in the current block and the adjacent pixel value; and*

*smoothing a pixel value around a boundary of the current block based on the type of the current block and the smoothing value.*

*28. The method of claim 27, wherein the adjacent pixel value is obtained from a block different than the current block.*

*29. The method of claim 27, wherein the smoothed pixel value is the obtained pixel value in the current block.*

*30. The method of claim 27, wherein the adjacent pixel value is adjacent to the obtained pixel value in the current block in a vertical direction.*

*31. The method of claim 27, wherein the adjacent pixel value is adjacent to the obtained pixel value in the current block in a horizontal direction.*

* * * * *